(No Model.)
A. S. BARKER.
APPARATUS FOR INSTANTANEOUS PHOTOGRAPHY.
No. 319,663. Patented June 9, 1885.
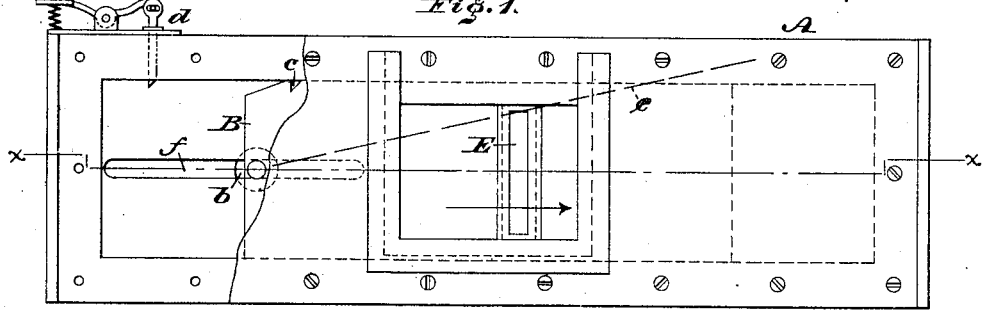
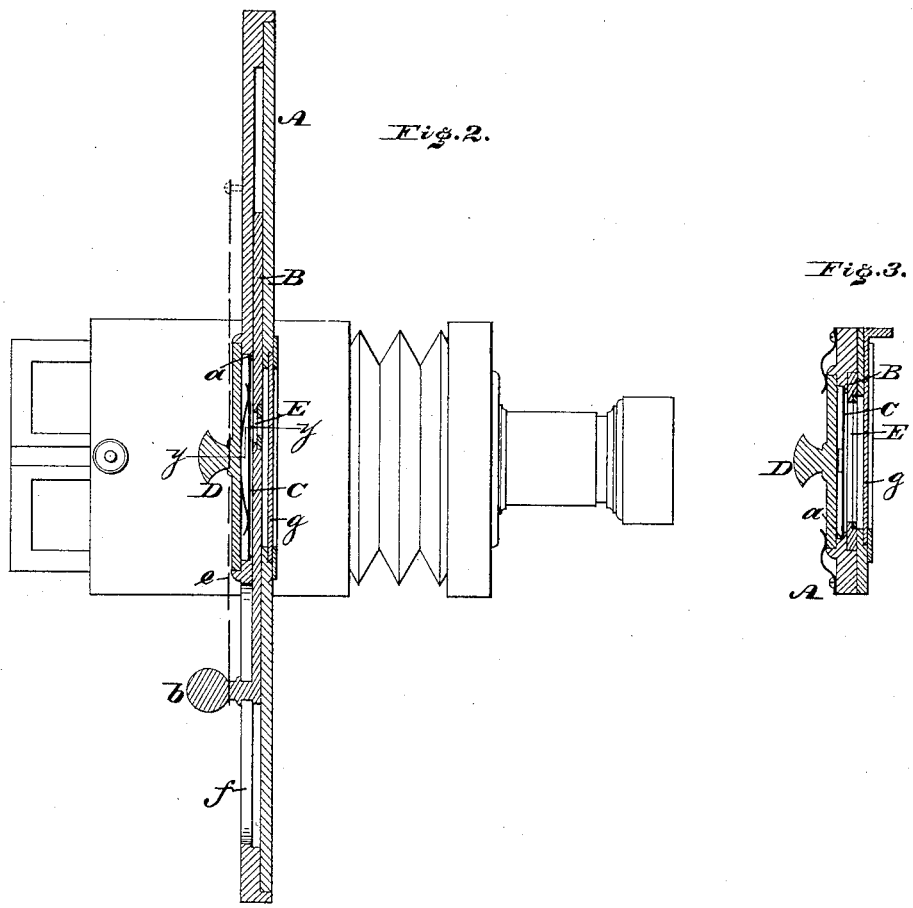
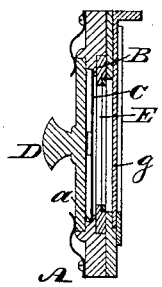
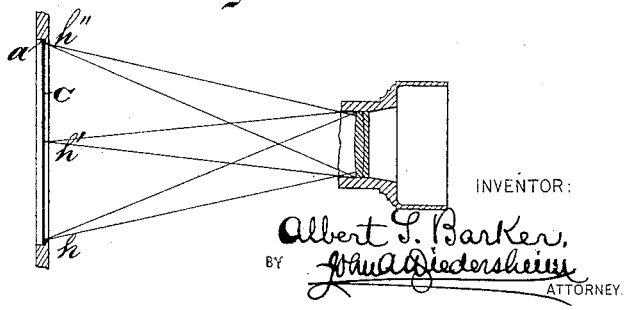
WITNESSES
A. P. Grant
W. F. Kircher
INVENTOR:
Albert S. Barker,
BY John A. Diedersheim
ATTORNEY.

UNITED STATES PATENT OFFICE.

ALBERT S. BARKER, OF CLIFTON, PENNSYLVANIA.

APPARATUS FOR INSTANTANEOUS PHOTOGRAPHY.

SPECIFICATION forming part of Letters Patent No. 319,663, dated June 9, 1885.

Application filed September 6, 1884. (No model.)

*To all whom it may concern:*

Be it known that I, ALBERT S. BARKER, a citizen of the United States, residing at Clifton, in the county of Delaware, State of Pennsylvania, have invented a new and useful Improvement in Apparatus for Instantaneous Photography, which improvement is fully set forth in the following specification and accompanying drawings, in which—

Figure 1 represents a front view of apparatus for instantaneous photography embodying my invention. Fig. 2 represents a top or plan view of a camera, and a horizontal section in line $x\,x$, Fig. 1, of the apparatus embodying my invention. Fig. 3 represents a vertical section in line $y\,y$, Fig. 2. Fig. 4 represents a horizontal section of the lens of the camera and the photographic plate.

Similar letters of reference indicate corresponding parts in the several figures.

My invention consists of improvements in apparatus for instantaneous photography, as hereinafter described, whereby a photographic plate is successively exposed at all points from one end to the other, thus insuring a photographic picture of a moving object or objects with a completeness of the detail thereof.

Referring to the drawings, A represents a frame within which is fitted a slide or shutter, B, back of which is a shoulder, $a$, against which the photographic plate C is rested.

D represents a holder for said plate, the same consisting of a suitable board or plate, which is attachable to the back of the frame A by means of chips, buttons, or other fastenings, and provided on its inner face with a spring, which bears against the photographic plate for retaining the same in position.

In the shutter B is a slot, E, which is made in the form of a frame removably connected with the shutter, so that slots of different sizes may be applied thereto, said shutter having a suitable knob or handle, $b$, whereby it may be readily drawn out to operative position, and a notch or shoulder, $c$, for the engagement of a bolt, latch, or other fastening, as at $d$, on the frame A, so that the shutter may be locked or held, the back of the frame being suitably slotted, as at $f$, to permit the passage of the knob or handle $b$. A spring, $e$, is connected with the knob or handle $b$ and a suitable part of the frame A, for the purpose of rapidly moving the shutter when the latter is released from the holding action of the fastening $d$.

It will be seen that the device or apparatus described is a combined plate-holder and exposing-shutter, it being noticed that the photographic plate is behind the shutter and separated therefrom by the small shoulder or rabbet on which it rests.

The device or apparatus is inserted in the instrument or camera, as shown in Fig. 2, it being noticed that the front of the frame A has a holder, $g$, for the shield primarily employed.

It will be seen that when the fastening $d$ is released the shutter, under impulse of the spring $e$, is rapidly moved, carrying the slot E past the photographic plate in a similar manner.

In Fig. 4 rays are illustrated as proceeding from the back lens to the three points $h\,h'\,h''$ of the photographic plate, and in Figs. 1 and 2 the slot E in the shutter is represented as having passed the point $h'$; but the rays project equally on the plate at every point thereof from end to end of the same, and each point is exposed by the passing slot for the shortest possible time consistent with a given amount of actinic action.

A slot half of an inch wide is made to move its own length in one one-hundredth part of a second; therefore in passing in front of point $h$ it exposes that point to the action of the full cone of rays for that length of time, each ray which takes part in the formation of that point of the image acting during all that period, and all the rays which form that point of the image acting at the same time; but the same slot, if moving in front of a lens, say of two inches aperture, while allowing each ray to act during the one one-hundredth part of a second, would consume five one-hundredths part of a second in clearing the opening of the lens; hence the great advantages presented by me, for the slot of a shutter moving at a given rate will pass any point on the photographic plate in much less time than it would require to traverse the diameter of the lens, while the actinic action is the same.

While other shutters, doors, and other means of exposing a photographic plate keep the entire plate continuously exposed, and for a longer time than the action of any given ray, my invention permits the successive exposure of all points of the plate from one end to the other, thus securing photographic pictures of moving objects complete in the details thereof.

It is evident that the shutter may be made to drop or move vertically and in circular directions and produce results similar to those occasioned by the horizontal arrangement of the same hereinbefore specified.

Having thus described my invention, what I claim as new, and desire to secure by Letters Patent, is—

An apparatus for instantaneous photography consisting of a frame-work adjustable to the back of a camera, containing a compartment for a sensitized plate, and immediately in front of the plate a shutter with a slot, the shutter being so arranged that the exposure is effected by the passage of a slot from end to end of the plate, and the plate is protected by the solid parts of the shutter before and after the passage of the slot.

ALBERT S. BARKER.

Witnesses.
 JOHN A. WIEDERSHEIM,
 A. P. GRANT.